(12) United States Patent
Rataj et al.

(10) Patent No.: US 8,958,144 B2
(45) Date of Patent: Feb. 17, 2015

(54) LASER MACHINING SYSTEM HAVING A MACHINING LASER BEAM THAT IS ADJUSTABLE IN TERMS OF ITS BRILLIANCE

(75) Inventors: Thomas Rataj, Oberönz (CH); Andreas Voss, Stuttgart (DE)

(73) Assignee: Trumpf Laser GmbH, Schramberg (DE)

( * ) Notice: Subject to any disclaimer, the term of this patent is extended or adjusted under 35 U.S.C. 154(b) by 0 days.

(21) Appl. No.: 14/115,416

(22) PCT Filed: Apr. 24, 2012

(86) PCT No.: PCT/EP2012/057453
§ 371 (c)(1),
(2), (4) Date: Feb. 14, 2014

(87) PCT Pub. No.: WO2012/150149
PCT Pub. Date: Nov. 8, 2012

(65) Prior Publication Data
US 2014/0177038 A1   Jun. 26, 2014

(30) Foreign Application Priority Data
May 4, 2011   (DE) .......................... 10 2011 075 213

(51) Int. Cl.
*H01S 3/30*   (2006.01)

(52) U.S. Cl.
USPC ........................................................ 359/334

(58) Field of Classification Search
USPC ........................................................ 359/334
See application file for complete search history.

(56) References Cited

U.S. PATENT DOCUMENTS 5,917,969 A    6/1999   Gavrilovic et al.
6,275,250 B1   8/2001   Sanders et al.
6,965,469 B2 * 11/2005   Avizonis et al. ........... 359/341.1
(Continued)

FOREIGN PATENT DOCUMENTS

DE   112008000872 T5   1/2010
GB   2439345 A   12/2007

OTHER PUBLICATIONS

Junhua Ji et al: "Analysis of the Conversion to the First Stokes in Cladding-Pumped Fiber Raman Amplifiers" IEEE Journal of Selected Topics in Quantum Electronics, IEEE Service Center, Piscataway, NJ, US, Bd.14, Nr. 1, 1. Jan. 2009 (Jan. 1, 2009), Seiten 129-139, XP011243301, ISSN:1077-260X, Seite 129, linke Spalte—Seite 136, rechte Spalte; Abbildungen 3,4,9-11.
(Continued)

*Primary Examiner* — Mark Hellner
(74) *Attorney, Agent, or Firm* — Fish & Richardson P.C.

(57) ABSTRACT

Laser machining system (60) comprises a high-power laser (61) for generating a high-power pump laser beam (HP-MM), control signal laser (62) for generating a control signal laser beam (SS), an optical fiber (64) leading from the two lasers to a laser machining head (63). The optical fiber has an SRS amplifier fiber (65) with an inner fiber core (65a) of higher brilliance and with an outer fiber core (65b) of lower brilliance surrounding the inner fiber core. The control signal laser beam (SS) is coupled into the inner fiber core and the pump laser beam (HP-MM) is coupled into the outer fiber core. The radiation component converted from the outer fiber core into the inner fiber core due to the SRS amplification is adjusted by means of the coupled-in power of the control signal laser beam (SS) to adjust the brilliance of the machining laser beam leaving the SRS amplifier fiber.

12 Claims, 3 Drawing Sheets

(56) References Cited

U.S. PATENT DOCUMENTS

| | | |
|---|---|---|
| 7,034,992 B2 * | 4/2006 | Komine .................. 359/334 |
| 2005/0078353 A1 | 4/2005 | Komine |
| 2007/0041409 A1 * | 2/2007 | Sudarshanam et al. ........... 372/6 |
| 2007/0147442 A1 | 6/2007 | Kumkar et al. |
| 2008/0277565 A1 | 11/2008 | Bookbinder et al. |

OTHER PUBLICATIONS

John E. Heebner et al: "High brightness, quantum-defect-limited conversion efficiency in cladding-pumped Raman fiber amplifiers and oscillators", Optics Express, Bd. 18, Nr. 14, Jul. 5, 2010, Seite 14705, XP55032373, ISSN: 1094-4087, DOI: 10.1364/OE.18.014705 Seite 14706, Absatz 1-Seite 14710, Absatz 2; Abbildungen 1-3.

International Search Report dated Jan. 31, 2013.

German Office Action dated Mar. 12, 2012.

International Preliminary Report on Patentability dated Nov. 14, 2013 along with English translation thereof.

* cited by examiner

LASER MACHINING SYSTEM HAVING A MACHINING LASER BEAM THAT IS ADJUSTABLE IN TERMS OF ITS BRILLIANCE

BACKGROUND

This application is a national stage application of International Application No. PCT/EP2012/057453 (WO 2012/150149 A3), filed Apr. 24, 2012 which is herein incorporated by reference in its entirety.

1. Field of the Invention

The invention relates to a laser machining system in which the brilliance of a machining laser beam can be adjusted.

2. Background

Hitherto, different machining processes have frequently been covered by separate laser machining systems, whereby for applications such as, for example, welding, radiation of medium brilliance (typical beam parameter product (BPP)≥8 mm•mrad) is preferably used, and for applications such as, for example, cutting, radiation of high brilliance (typical BPP≤4 mm•mrad) or, for example in remote cutting, even highest brilliance (BPP≈0.4 mm•mrad) is preferably used. High-power laser systems which require only one laser and permit rapid (<100 ms) switching between two or even three different radiation types have hitherto not been possible because of a lack of optical components in the high-power range (>2 kW), such as, for example, beam switches. In addition to the radiation types for the machining of materials, the beam qualities of the laser sources can also be divided into three ranges, which are generally subject to different physical limits:

single-mode range (beam quality factor M≤1.5 or BPP<2 about 0.4 mm•mrad)
few-mode range (1.5<M2<6 or 0.4<BPP<2 mm•mrad)
multimode range (M2≥6 or BPP≥2 mm•mrad).

The closest dual-brilliance laser machining system 10 shown in FIG. 1 has two different laser sources, namely a first laser source 11 with high-power multimode radiation (HP-MM) and a second laser source 12 with high-power single-mode radiation (HP-SM). These two radiations with their different brilliancies are fed to a laser machining head 13 via transport fibres 14 and can be used electively as a machining laser beam 15. In addition to the disadvantage of high operating and installation costs, the laser machining system 10 also has the disadvantage of the limited lengths of transport fibres in the high-power range for single-mode radiation (<10 m) and also for few-mode radiation (<100 m), These arise owing, to non-linear effects in the transport fibre, which occur to an increased extent at high powers. Multimode radiation in the high-power range, on the other hand, can be transported almost without loss over the transport distances of 100 m required in industry.

FIG. 2 shows an alternative dual-brilliance laser machining system 20 which has only one laser source 21 with high-power multimode radiation (HP-MM). Two separate conventional transport fibres 22 are connected to two laser outputs of the laser source 21, so that the power is fed via one of the two transport fibres 22 to the laser machining head 23. In the laser machining head 23 itself, one of the two transport fibres 22 is simply guided through and thus constitutes a fibre output with the brilliance of the laser source 21. The other transport fibre 22, on the other hand, is attached to an ytterbium fibre oscillator 24, which improves the beam quality of the laser source significantly and thus provides a fibre output with radiation of high or highest brilliance. However, stepless mechanical switching between the two transport fibres 22 is not possible, and it is also only relatively slow (typically 100 ms). The machining laser beam leaving the laser machining head 23 is denoted 25.

The dual-brilliance laser machining system 30 shown in FIG. 3, which has a laser source 31 with high-power multimode radiation (HP-MM) and a fibre-integrated optical beam switch 32, functions in a similar manner. The high-power multimode radiation (HP-MM) of the laser source 31 is fed to the beam switch 32, which is located upstream of the laser machining head 33, by a conventional transport fibre 34. The beam switch 32 is able to switch (<10 ms) the radiation between two fibres 35 of identical construction without changing the quality of the beam. One fibre 35 is simply guided through the laser machining head 33 and thus constitutes a fibre output with the brilliance of the laser source 31. The other fibre 35 is attached to an ytterbium fibre oscillator 36, which improves the beam quality of the laser source significantly and thus provides a fibre output with radiation of high or highest brilliance. The machining laser beam leaving the laser machining head 33 is denoted 37.

Optical beam switches for multimode radiation are available commercially. These beam switches are free-beam solutions which cannot, however, be used for single-mode radiation. The switching times in these beam switches are between 50-100 ms, and the power capability is greatly dependent on the quality of the brilliance preservation between the input and the output fibre. Starting from radiation of high brilliance it is possible to couple by fibre-to-fibre coupling to a fibre with a greater beam parameter acceptance, so that radiation of medium brilliance is generated by mode excitation.

FIG. 4 shows a dual-brilliance laser machining system 40 which has a laser source 41 with high-power single-mode radiation (HP-SM) and a fibre-integrated optical beam switch 42. The single-mode radiation is implemented from the single-mode transport fibre 43 in the laser machining head 44 on fibres 45 with different beam parameter acceptance. Using this principle, each of the three radiation types mentioned above can be generated from the laser source 41. Disadvantages are, however, both the very short single-mode transport fibre (<10 m) and the extremely high power densities in the beam switch 42. The machining laser beam leaving the laser machining head 44 is denoted 46.

FIG. 5 shows a further commercial dual-brilliance laser machining system 50, which has a laser source 51 with high-power multimode radiation (HP-MM) and a multi-clad transport fibre 52. The radiation of the laser source 51 is coupled into either the inner fibre core 52a or an outer fibre core 52b which surrounds the inner fibre core 52a annularly, in order to obtain radiation with different brilliancies in the laser machining head 53. The machining laser beam leaving the laser machining head 53 is denoted 54. For cutting applications, the laser radiation is coupled into the inner fibre core 52a, which is typically 100 µm in size, of the multi-clad transport fibre 52. For welding applications, a suitable wedge is additionally introduced into the free propagation beam of the laser beam. The resulting beam shift upstream of a focusing lens effects a displacement of the focal point from the inner fibre core 52a of the multi-clad transport fibre 52 into the outer fibre core 52b which, with an outside diameter of 400 µm to 600 µm, is far larger. Two different brilliances can thus be selected from only one transport fibre by simple and also rapid switching. However, owing to the free propagation beam coupling, this, principle can be used in the high-power field only in the multimode range.

SUMMARY

In light of the above, the object of the invention is to make possible rapid and simple switching between different radiation types of a high-power laser.

The object is achieved according to the invention by a laser machining system in which the brilliance of a machining laser beam can be adjusted. The system includes a high-power laser for generating a high-power pump laser beam (HP-MM), having a control signal laser for generating a control signal laser beam, and having at least one optical fibre leading from the two lasers to a laser machining head, which optical fibre has an SRS amplifier fibre with an inner fibre core of higher brilliance and with an outer fibre core of lower brilliance surrounding the inner fibre core. The control signal laser beam is coupled into the inner fibre core and the pump laser beam (HP-MM) is coupled into the outer fibre core and wherein, for adjusting the brilliance of the machining laser beam leaving the SRS amplifier fibre, the radiation component converted from the outer fibre core into the inner fibre core due to the SRS amplification is adjusted by means of the coupled-in power of the control signal laser beam (SS).

According to the invention, rapid and simple switching between different radiation types of a high-power laser, as is required, for example, in the laser machining of materials, is made possible by means of a weak optical control signal laser beam. This opens up a very flexible adaptation to rapidly changing machining processes, such as, for example, laser cutting with the required high brilliance and laser welding with the required medium brilliance. The high or even highest brilliance is thereby generated in dependence on the power of the control signal laser beam and of the pump laser beam by means of non-linear amplification on the basis of stimulated Raman scattering (SRS) in an SRS amplifier fibre, that is to say the increase in the power of the control signal laser beam produces an increase in the power component of the high or also highest brilliance.

The laser machining system according to the invention with optically controlled beam quality permits the flexible, rapidly changing performance of a plurality of machining processes with different requirements in terms of beam quality using a single high-power beam source, and it additionally makes use of the advantages of SRS amplification. The use solely of passive fibres avoids many of the technological problems of the present time. Mention may be made here of the occurrence of photodarkening in actively doped fibres, which can limit the lifetime of fibre lasers, and the dependency of the pumping wavelength on the chosen active materials. The laser machining system according to the invention can be produced with only a few or even no joints, so that very high powers (10 kW range) are possible. The switching operation is not limited to the switching speed of the mechanical beam switches but takes place optically almost instantaneously with the control signal laser beam.

A broad range of new degrees of freedom in the machining of materials is thus opened up. This is on the one hand the use of single-mode or few-mode and multimode radiation from one and the same laser source and, in addition, the use, which did not exist hitherto, of the stepless overlap of the two radiation types. In addition, it is possible to modulate the power ratio between the radiation types very quickly. This option can bring advantages for efficient material machining which cannot as yet be foreseen more accurately. These structural and material-dependent aspects can on the one hand lower the production costs for beam sources and at the same time broaden the flexibility of the laser source significantly.

The invention also relates in a further aspect to a method for adjusting the brilliance of a machining laser beam of a laser machining system wherein a control signal laser beam is coupled into an inner fibre core, which has a higher brilliance, of an SRS amplifier fibre and a high-power pump laser beam (HP-MM) is coupled into an outer fibre core of the SRS amplifier fibre, which outer fibre core surrounds the inner fibre core and has a lower brilliance, and wherein, for adjusting the brilliance of the machining laser beam leaving the SRS amplifier fibre, the radiation component converted from the outer fibre core into the inner fibre core due to the SRS amplification is adjusted by means of the coupled-in power of the control signal laser beam.

Further advantages of the invention will become apparent from the description and the drawings. Likewise, the features mentioned above and those mentioned below can each be used on their own or in any desired combinations. The embodiments that are depicted and described are not to be interpreted as being a conclusive list but instead are of an exemplary nature for illustrating the invention.

DETAILED DESCRIPTION

Figure 1:
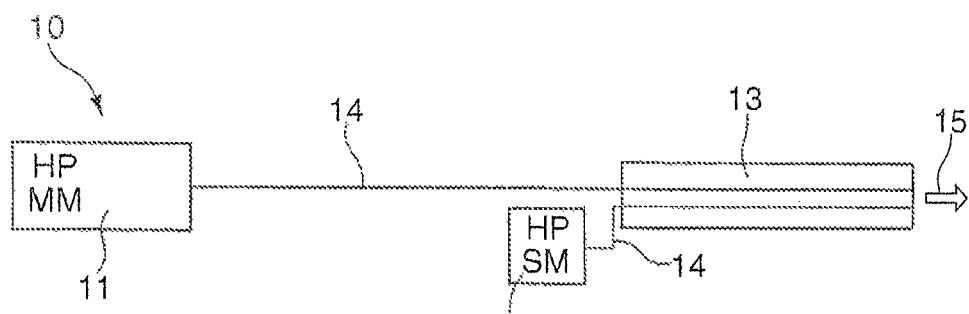
FIGS. 1 to 5 show various known dual-brilliance laser machining systems.
Figure 2:
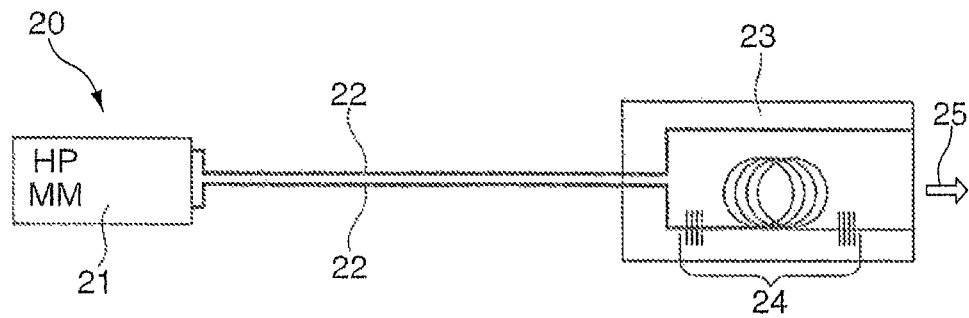
Figure 3:
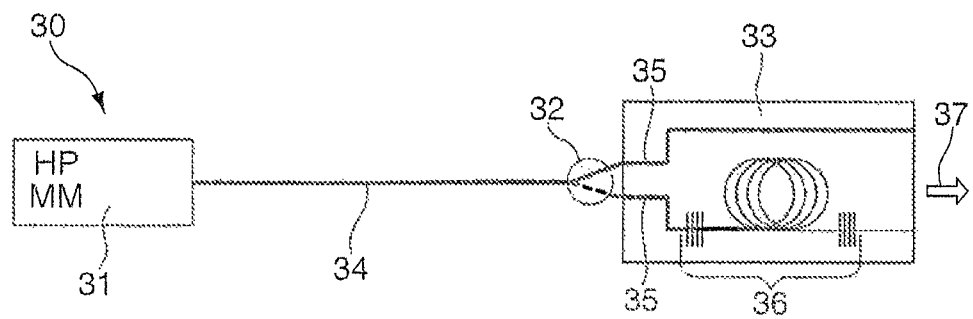
Figure 4:
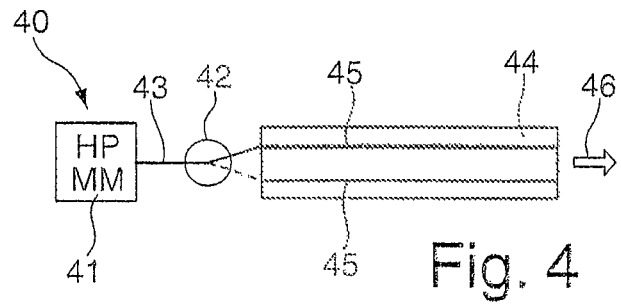
Figure 5:
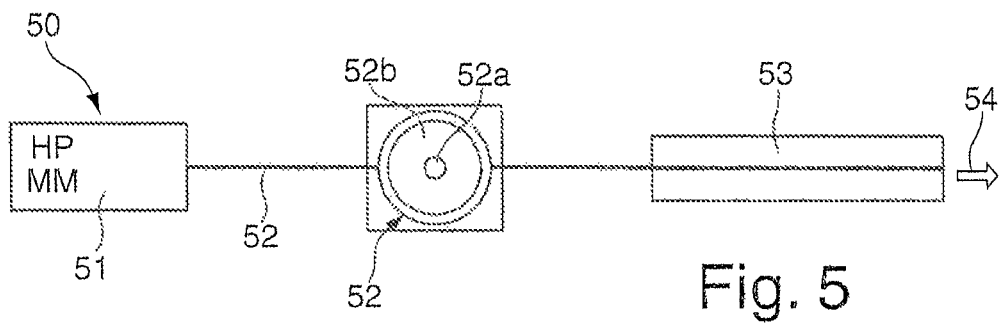
Figure 6:
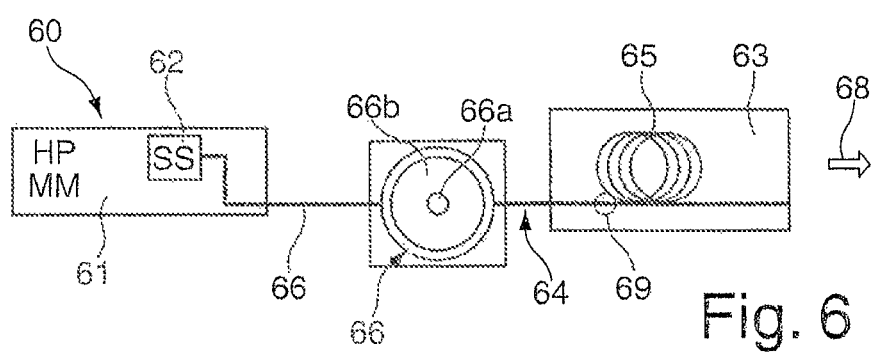
FIG. 6 shows a first laser machining system according to the invention having a transport fibre and an SRS amplifier fibre.

The laser machining system 60 shown in FIG. 6 comprises a high-power laser 61 for generating a multimode high-power pump laser beam HP-MM, a control signal laser 62 for generating a single-mode or few-mode control signal laser beam SS, and an optical fibre 64 leading from the two lasers 61, 62 to a laser machining head 63. The control signal laser beam SS can be considered as a separate laser system or as an extension of the high-power laser 61. For protecting the control signal laser beam, an oscillator-amplifier combination can be used, for example, in which an isolator optically separates the signal transmitter (oscillator) from the remainder of the high-power system.

Figure 7A:
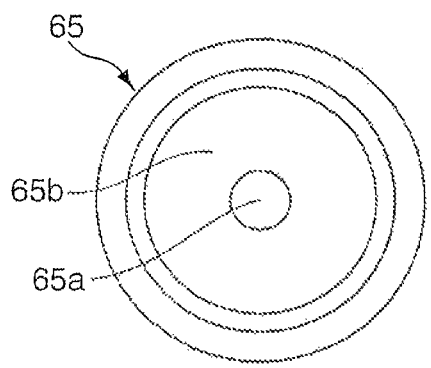
FIGS. 7a, 7b show, schematically, the fibre cross-section (FIG. 7a) of an SRS amplifier fibre and the fibre cross-section (FIG. 7b) of a wavelength-selective SRS amplifier fibre.
Figure 7B:
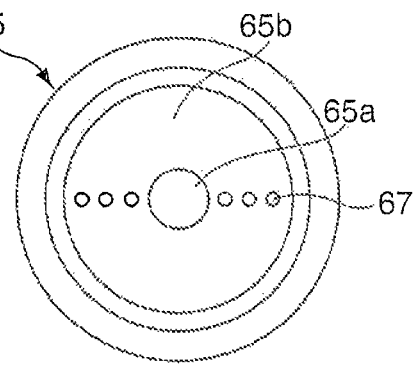

The optical fibre 64 comprises an SRS amplifier fibre 65 of, for example, quartz glass, which can be arranged in the laser machining head 63, as well as a multi-clad transport fibre 66 of, for example, quartz glass, which leads from the two lasers 61, 62 to the SRS amplifier fibre 65. The transport fibre 66 has an inner fibre core 66a and an outer fibre core 66b surrounding the inner fibre core 66a annularly. As is shown in FIG. 7a, the SRS amplifier fibre 65 has an inner fibre core 65a and an outer fibre core 65b surrounding the inner fibre core 65a annularly. The inner fibre core 65a of the SRS amplifier fibre 65 has a higher brilliance on the output side than the outer fibre core 65b of the SRS amplifier fibre 65. As is indicated merely schematically in FIG. 7b, wavelength-selective structures 67 can additionally be provided in the outer fibre core 65b of the SRS amplifier fibre 65.

The control signal laser beam SS is coupled into the inner fibre core 66a of the transport fibre 66 and guided, without loss, into the inner fibre core 65a of the adjoining SRS amplifier fibre 65. The pump laser beam HP-MM is coupled into the outer fibre core 66b of the transport fibre 66 and coupled, without loss, into the outer fibre core 65b of the adjoining SRS amplifier fibre 65. An interaction of the two laser beams HP-MM and SS takes place in the SRS amplifier fibre 65 via stimulated Raman scattering.

The amplification process used here is stimulated Raman scattering (SRS), which occurs in optically transparent media. SRS behaves similarly to a laser process, but the excitation of the active medium takes place not via the absorption of pumped light (as in optical media with laser-activated doping) but via the scattering of the pumped light at molecules: this excitation is dissipated again in a radiant manner within very short times (<<1 ps). By means of the coupled-in power of the control signal laser beam SS, the radiation component converted from the outer fibre core 65b into the inner fibre core 65a due to the SRS amplification, and thus the brilliance of the machining laser beam 68 leaving the SRS amplifier fibre 65, can be adjusted.

Figure 8:
FIG. 8 shows various machining laser beams generated with the laser machining system according to the invention.

FIG. 8 shows the power-beam profiles (near fields) of three machining laser beams 68 with different beam qualities generated by the laser machining system 60, wherein the power P of the machining laser beam is plotted over its beam diameter. At full power of the control laser signal SS, the multimode pump laser beam HP-MM is converted completely into the single-mode or few-mode radiation of the inner fibre core 65a, which leads to a Gaussian beam profile of high or highest brilliance at the fibre output (FIG. 8, left-hand power-beam profile). When the control signal laser beam SS is switched off, on the other hand, the multimode pump laser beam HP-MM is able to pass unhindered through the SRS amplifier fibre 65 and generates a multimode flat-top profile at the fibre output (FIG. 8, middle power-beam profile). In addition, a combination of the Gaussian radiation of high or highest brilliance and the multimode flat-top can be generated by means of a defined medium power of the control signal laser beam SS by coaxial overlaying of the two radiation types (FIG. 8, right-hand power-beam profile). This offers the possibility of changing the ratio of the two radiation types almost instantaneously by rapid power modulation of the control signal laser beam SS—into the MHz range—and accordingly of achieving very rapid modulation of the power-beam profiles or of the near field.

In addition to power scaling, efficient SRS amplification is also determined by the following parameters:

The brilliance of the high-power laser (pump laser source) 61 should be sufficiently high. High brilliance of the pump laser beam HP-MM results in a greater mode overlap with the control signal laser beam SS. Because the SRS amplification coefficient in quartz glass is only about 1×10-13 mN/V at 1080 nm, this weak SRS amplification means that a high brilliance of the pump radiation of at least about 4 mm•mrad is necessary for efficient operation with acceptable fibre lengths of not more than about 100 m.

The central wavelength of the control signal laser beam SS should preferably lie on the first Stokes-shifted line with respect to the central wavelength of the pump laser beam HP-MM. The Stokes shift is dependent on the fibre material and is, for example, 13.2 THz in the case of quartz. The central wavelength of the pump laser beam itself can be freely chosen, because the SRS amplification coefficient is only slightly wavelength-dependent.

The spectral width of the pump laser beam HP-MM and of the control signal laser beam SS should preferably be less than 10 nm in each case.

The SRS amplifier fibre 65 should preferably have wavelength-selective properties. In order that the cascaded SRS effect in the outer fibre core 65b is interrupted after the first Stokes line, the SRS amplifier fibre 65 should correspondingly have large losses at the second Stokes line. This property can be solved with a large number of already existing technologies (long period gratings, Bragg fibres, distributed spectral filtering (DSF)-PCF, etc.), for example with the wavelength-selective structures 67 shown in FIG. 7b.

The wavelength-selective function of the SRS amplifier fibre can be so optimised that a plurality of Stokes lines (instead of only the first Stokes line) can be excited at the same time. For example, only the 5th Stokes order can receive high losses, so that the 1st to 4th Stokes lines oscillate (cascaded Raman effect). This would have the advantage that the laser light with high or highest brilliance is displaced further from the pumping wavelength (in the example: 4 times≈50 nm) and can optionally (at a suitable pumping wavelength) be converted into the more eye-safe range (at 1500 nm). At maximum power of the control signal, the laser light with high or highest brilliance would thereby be converted into the 4th Stokes line. In the case of the cascade it is to be noted that the quantum loss also increases as the Stokes order increases.

When using non-polarisation-maintaining SRS amplifier fibres, preferably both radiation types should have a uniformly depolarised state for optimum SRS amplification. This can be achieved both with special properties of the two lasers 61, 62 and also with the use of polarisation-destroying transport fibres 66. In order that a particular polarisation state can be amplified efficiently, on the one hand both radiation types should have the same polarisation state, and on the other hand both the SRS amplifier fibre 65 and the transport fibre 66 should be able to maintain that polarisation of the two radiation types.

Under optimum boundary conditions, the Stokes efficiency of the SRS amplification at 1 μm pumping wavelength is about 95%; a conversion efficiency of about 86% is achievable with realistic assumptions via the passive losses of the SRS amplifier fibre 65.

Figure 9A:
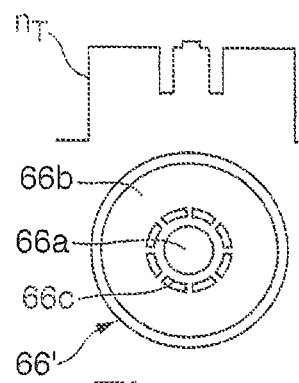
FIGS. 9a-9c show, schematically, the fibre cross-section (FIG. 9a) of a brilliance isolation fibre with the associated refractive index profile, the refractive index profile (FIG. 9b) in a transfer fibre section, and the fibre cross-section (FIG. 9c) of the SRS amplifier fibre with the associated refractive index profile.

The transport of the two radiation types to the SRS amplifier fibre 65 is achieved with low loss in the transport fibre 66, in which the SRS amplification is suppressed. This is possible, for example, with a so-called brilliance isolation fibre 66' (FIG. 9a), in which the inner fibre core 66a and the outer fibre core 66b are separated from one another by an isolating or intermediate sheath 66c of air capillaries or low-doped glass, as a result of which the mode or modes of the control signal laser beam SS and the modes of the high-power laser beam HP-MM are transported spatially separated from one another.

Figure 9B:
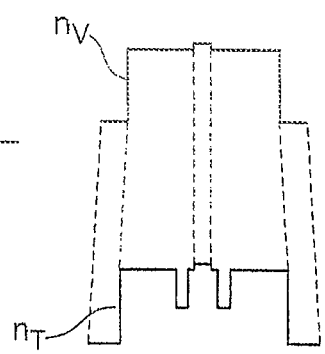
Figure 9C:
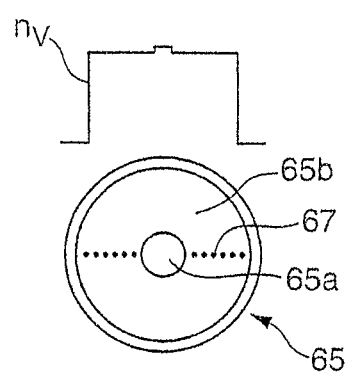

After the transport of the two radiation types, transfer from the transport fibre 66 to the SRS amplifier fibre 65 takes place, for example by means of an intermediately arranged transfer fibre section ("taper") 69 (FIG. 6). As is shown in FIG. 9b, a gradual transfer from the refractive index profile nT of the transport fibre 66 to the refractive index profile nV, shown in FIG. 9c, of the SRS amplifier fibre 65 takes place in the transfer taper 69. The transfer taper 69 reduces the thickness of the isolating sheath 66c so far that the different transverse modes of the two radiation types guided in the outer and inner fibre cores 65a, 65b can interact with one another unhindered. This transfer taper 69 can be achieved by allowing the air holes of the isolating sheath 66c to collapse at one fibre end of the brilliance isolation fibre 66'. This collapsed fibre end of the brilliance isolation fibre is then attached to the SRS amplifier fibre 65.

The transport fibre 66 and the SRS amplifier fibre 65 can also be formed by a single brilliance isolation fibre 66', which already possesses the wavelength-selective properties of the SRS amplifier fibre. The air holes of the isolating sheath 66c of the brilliance isolation fibre 66' are then collapsed for example by means of a fibre-drawing tower to the fibre length at which the SRS amplification is to take place. Because no joints occur thereby, the power capability is substantially improved.

In the SRS amplifier fibre 65, the efficient amplification of the control signal laser beam takes place in dependence on the power thereof. In order to save installation space, to conserve the beam quality of the amplified control signal laser beam and at the same time to dissipate the thermal losses of the SRS amplification, it is advantageous to cool the SRS amplifier fibre 65 in the rolled state.

Figure 10:
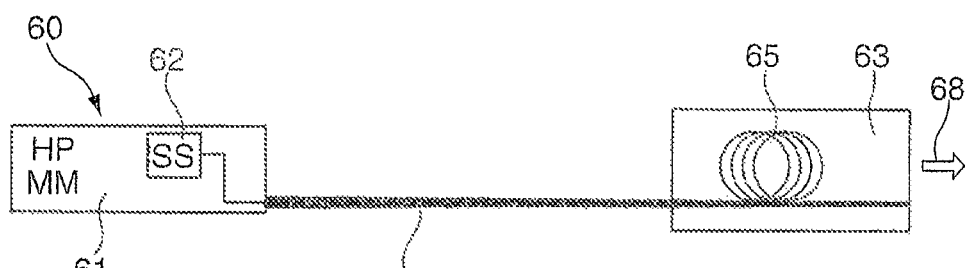
FIG. 10 shows a second laser machining system according to the invention.

The laser machining system 60 shown in FIG. 10 differs from the laser machining system of FIG. 6 in that the diameter of the outer fibre core 66b of the transport fibre 66 tapers in the beam direction to the diameter of the outer fibre core 65b of the amplifier fibre 65. Taking account of the effective mode overlap of the two radiation types, this transport fibre 66 is able to further the amplification of the control signal only towards the end. The efficient SRS amplification consequently takes place in the amplifier fibre 65. The tapering of the transport fibre 66 merely affects the outer fibre core 66b, while the diameter of the inner fibre core 66a remains constant over the entire length of the transport fibre 66. This transport fibre 66 tapered in the outer fibre core 66b thus assumes the function of the brilliance isolation fibre 66', of the transfer taper 69 and also, to a small extent, the function of SRS amplification. The production of a transport fibre 66 tapered in the outer fibre core 66b is connected with the production of special preforms and actively controlled fibre drawing. The special conical preforms can be produced, for example, by the tapering of a preform, which is subsequently added to an inner fibre core by the so-called stack-and-draw process. Likewise, a conventional graded-index double-clad preform can be formed conically by suitable etching processes and then provided with a low-index sheath in the drawing process.

Figure 11:
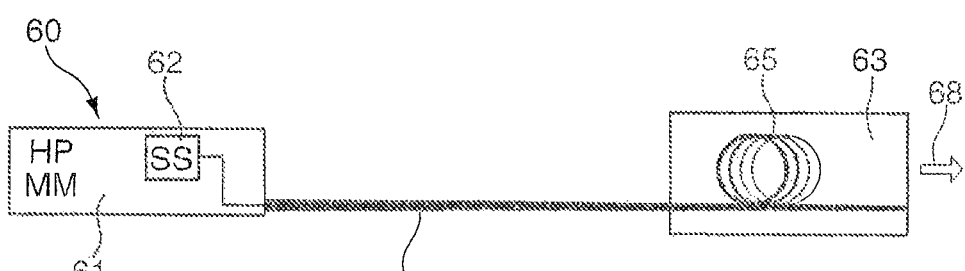
FIG. 11 shows a third laser machining system according to the invention.

In the laser machining system 60 shown in FIG. 11, the special amplifier fibre 66, 65 assumes the role of the brilliance isolation fibre 66', of the transfer taper 69 and at the same time of efficient SRS amplification, The entire fibre system 66, 65 can thus be drawn from a suitable preform in one piece in which there is a tapering of the diameter of the outer fibre core 65b, 66b. Over the entire length of the fibre a wavelength-selective property is required. In the first fibre section 66, the transport of the radiation types by a relatively small effective mode overlap is first preferred. The fibre section 66 can render the amplification of the control signal ever more effective towards the end. Owing to the continuing tapering of the diameter of the outer fibre core 66b, 65b in the beam direction, an efficient SRS amplification is consequently generated in the fibre section 65 by an increasing effective mode overlap. The fibre section 65, in which the efficient SRS amplification for the most part takes place, is advantageously wound cooled.

The invention claimed is:

1. Laser machining system for adjusting a brilliance of a machining laser beam, comprising:
   a high-power laser for generating a high-power pump laser beam;
   a control signal laser for generating a control signal laser beam; and
   at least one optical fiber leading from the two lasers to a laser machining head, the optical fiber comprising an SRS amplifier with an inner fiber core of higher brilliance and with an outer fiber core of lower brilliance surrounding the inner fiber core,
   wherein, at one end of the optical fiber, the control signal laser beam is coupled into the inner fiber core and the pump laser beam is coupled into the outer fiber core and wherein, for adjusting the brilliance of the machining laser beam leaving the SRS amplifier, the radiation component converted from the outer fiber core into the inner fiber core due to the SRS amplification is adjusted by changing a coupled-in power of the control signal laser beam.

2. Laser machining system according to claim 1, wherein a central wavelength of the control signal laser beam corresponds to a first Stokes line with respect to the central wavelength of the pump laser beam.

3. Laser machining system according to claim 1, wherein a spectral width of the pump laser beam and of the control signal laser beam is less than 10 nm in each case.

4. Laser machining system according to claim 1, wherein the pump laser beam has a brilliance of at least about 4 mm·mrad.

5. Laser machining system according to claim 1, wherein the control signal laser beam is single-mode or few-mode radiation.

6. Laser machining system according to claim 1, wherein the pump laser beam is multimode radiation.

7. Laser machining system according to claim 1, wherein the outer fiber core of the SRS amplifier has wavelength-selective structures.

8. Laser machining system according to claim 1, wherein the optical fiber has a transport fiber leading from the high-power laser and the control signal laser to the SRS amplifier, wherein the control signal laser beam is coupled into an inner fiber core of the transport fiber and the pump laser beam is coupled into an outer fiber core of the transport fiber surrounding the inner fiber core.

9. Laser machining system according to claim 8, wherein the transfer from the transport fiber to the SRS amplifier takes place through a transfer taper.

10. Laser machining system according to claim 8, wherein the diameter of the outer fiber core of the transport fiber tapers in the beam direction of the diameter of the outer fiber core of the SRS amplifier.

11. Laser machining system according to claim 8, wherein the transport fiber and the SRS amplifier are formed by a fiber drawn from one piece.

12. A method for adjusting a brilliance of a machining laser beam of a laser machining system, comprising:
   coupling a control signal laser beam into an inner fiber core of at least one optical fiber at one end of the optical fiber, wherein the inner fiber core has a higher brilliance, and the optical fiber comprises an SRS amplifier;
   coupling a high-power pump laser beam into an outer fiber core of the optical fiber at the one end of the optical fiber, wherein the outer fiber core surrounds the inner fiber core and has a lower brilliance; and changing a coupled-in power of the control signal laser beam to adjust a radiation component converted from the outer fiber core into the inner fiber core due to an SRS amplification of the SRS amplifier, thereby adjusting the brilliance of the machining laser beam leaving the optical fiber.

\* \* \* \* \*